A. BENSON.
BALL BEARING HUB.
APPLICATION FILED FEB. 9, 1918.
1,303,235.
Patented May 13, 1919.
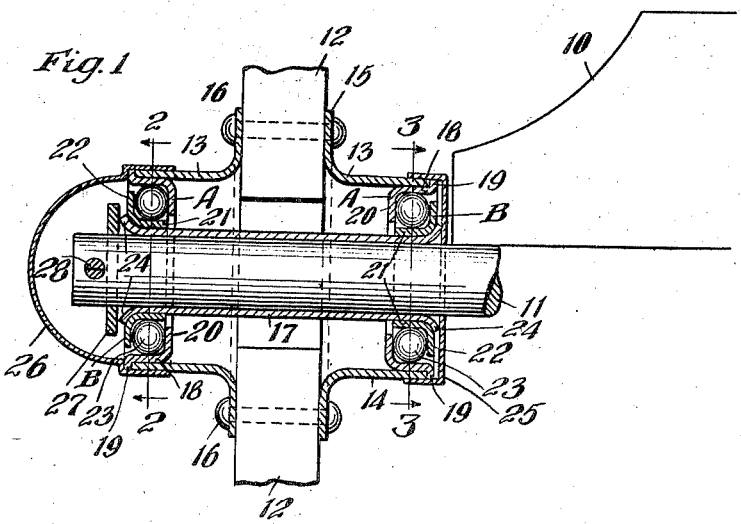
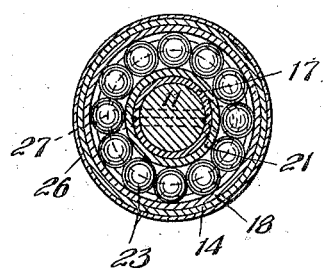
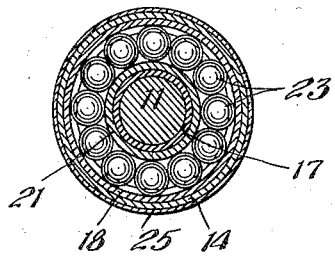
Inventor:
Andrew Benson
George I. Haight
Atty.

UNITED STATES PATENT OFFICE.

ANDREW BENSON, OF JANESVILLE, WISCONSIN, ASSIGNOR TO JANESVILLE PRODUCTS COMPANY, OF JANESVILLE, WISCONSIN, A CORPORATION OF WISCONSIN.

BALL-BEARING HUB.

1,303,235.     Specification of Letters Patent.     Patented May 13, 1919.

Application filed February 9, 1918. Serial No. 216,199.

*To all whom it may concern:*

Be it known that I, ANDREW BENSON, a citizen of the United States, residing at Janesville, in the county of Rock and State of Wisconsin, have invented a certain new and useful Improvement in Ball-Bearing Hubs, of which the following is a full, clear, concise, and exact description, reference being had to the accompanying drawings, forming a part of this specification.

This invention relates to improvements in ball-bearing hubs.

For a long time the need has been felt for a cheap and simple ball-bearing for wheels of children's express carts, Irish mails and the like, which ball bearing wheels could be manufactured at a sufficiently low cost to warrant the use thereof with the comparatively low priced wagon or cart. Further, difficulty has also been encountered in the providing of such a cheap ball-bearing wheel due to the inability of shipping the ball-bearing wheels in a knock-down condition in such a manner that the wheels could be assembled with the other portion of the cart or wagon without requiring expert knowledge and without danger of injuring or losing any of the parts.

The object of my invention is to provide an exceedingly simple and comparatively inexpensive ball-bearing hub for a wheel or other rotating member, which ball-bearing hub may be shipped completely assembled with the wheel and which requires no adjustment or particular skill when the wheel is assembled with the other part of the wagon or cart.

Another and more specific object of the invention is to provide a ball-bearing hub of the character above indicated which is made entirely of sheet metal with the exception of the anti-friction balls themselves.

In the drawing forming a part of this specification, Figure 1 is a diagrammatic sectional view of a wheel with my improvements shown in connection therewith, the wheel being shown in position on the axle of a child's express wagon. Figs. 2 and 3 are sectional views taken on the lines 2—2 and 3—3, respectively, of Fig. 1.

In said drawing, 10 indicates a portion of the bolster of a child's express wagon or Irish mail and to which is secured an axle 11 of usual construction.

The improved wheel and ball-bearing hub, as shown, comprises a plurality of wood spokes 12 suitably held in assembled relation by what may be termed an outer hub member, the outer hub member in the structure shown comprising two sheet metal elements 13—13. Each of said elements 13 comprises a true annular section 14 and an outwardly extended inner flange 15, the spokes being bolted or riveted to the flanges 15, as indicated at 16—16.

The hub also includes what may, for convenience, be termed an inner hub member 17, which is in the form of a hollow sheet metal tube of a length corresponding to the length of the hub. To form the ball-bearing between the outer and inner hub members 13 and 14, I provide the following arrangement: At each end of the hub, I employ two race-plates A and B. The outer race-plate A has an annular portion 18 which fits snugly within the adjacent portion 14 of the corresponding hub member 13; an outer relatively narrow, outwardly extended flange 19 which engages against the outer edge of the corresponding portion 14; and an inwardly extending wider inner flange 20 at right angles to the portion 18 of the race-plate A. The inner race-plate B is of substantially right-angle cross section having a true circular portion 21 fitting the inner hub member or sleeve 17 and an outwardly directed flange 22 substantially at right angles to the axis of the wheel. As will be clear from an inspection of Fig. 1, the race-plates A and B are oppositely disposed to thereby form a race-way of substantially rectangular cross section for the series of anti-friction balls 23.

As will be evident, the race-plates A—A are prevented from inward movement relatively to the outer hub member by the outwardly turned narrow flanges 19—19, and in order to prevent the race-plates B—B from moving outwardly with respect to the inner hub member 17, the latter is flared or provided with bell mouths at its ends, as indicated at 24—24.

With the arrangement above described, it will be seen that all of the parts of the hub, with the exception of the anti-friction balls themselves, are made of sheet metal and may be stamped and pressed at comparatively small expense and when all the parts are in the position shown in the drawing, they are held in their proper assembled relation thereby permitting the wheel with its ball-bearing hub to be shipped separate from the body of the wagon or express cart.

In order to protect the parts from the elements and foreign matter, an inner dust cap 25 may be telescoped over the inner end of the ball-bearing and a suitable outer dust cap 26 telescoped over the outer end of the hub, it being understood that the outer dust cap 26 is applied after the wheel is in position on the axle 11 and the washer 27 and cotter 28 placed in position to retain the wheel on the axle.

In manufacturing the improved ball-bearing hub, the outer hub members 13—13 can be stamped and pressed in quantities in the form shown in the drawing, as can also the race-plates A and B. In assembling the parts, the race-plates A are first inserted, then the inner hub or sleeve member 17, then the series of anti-friction balls, and finally the race-plates B—B. After this is done, the ends of the inner hub member or sleeve 17 are drawn or spun to the shape shown in the drawing which insures all the parts remaining in proper assembled relation. In actual practice, both ends of the member 17 may be flared simultaneously, or, if preferred, one end may be flared before the parts are assembled and the other end flared as the last operation.

The device is exceedingly simple and inexpensive to manufacture; requires no adjustment or skill on the part of the user; all danger of any of the parts becoming lost or displaced during shipment is absolutely prevented; in the event of breakage or wear of any part of the hub, the wheel may be returned to the factory and repairs or replacements made at very slight expense; and the invention enables the use of ball-bearing wheels on comparatively cheap grades of carts, wagons and elsewhere where heretofore the comparatively high cost of the usual ball-bearings on the market has prohibited their use as a commercial proposition.

Although I have herein shown and described what I now consider the preferred manner of carrying out the invention, the same is merely illustrative, and I contemplate all changes and modifications that come within the scope of the claim appended hereto.

I claim:

In a ball-bearing hub, the combination with spaced, inner and outer sheet metal hub members, the outer hub member having cylindrical end portions over which dust caps are adapted to be telescoped; of an outer sheet metal race-plate at each end of the hub, each of said race-plates comprising a cylindrical portion telescoped with a snug fit within the end of the outer hub member, each of said race-plates having also an outwardly extended, relatively narrow flange engaging the adjacent end of the outer hub member, and also an inwardly extended flange; inner sheet metal race-plates at each end of the hub, each of said inner race-plates comprising an annular member of substantially rightangular cross section; a plurality of antifriction balls coöperable with each pair of race-plates at each end of the hub; said inner sheet metal hub member having both end edge portions thereof outwardly flared to overlap said inner race-plates.

In witness that I claim the foregoing I have hereunto subscribed my name this 24th day of Jan., 1918.

ANDREW BENSON.

Witnesses:
W. R. KOHLER,
R. E. WISNER.